United States Patent
Kawasaki et al.

(10) Patent No.: US 6,953,099 B2
(45) Date of Patent: Oct. 11, 2005

(54) BODY STRUCTURE OF FUEL CELL VEHICLE

(75) Inventors: Satoshi Kawasaki, Kawachi-gun (JP); Tohru Ono, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 75 days.

(21) Appl. No.: 10/611,202

(22) Filed: Jun. 30, 2003

(65) Prior Publication Data

US 2004/0020696 A1 Feb. 5, 2004

(30) Foreign Application Priority Data

Jul. 2, 2002 (JP) .................................. 2002-193576

(51) Int. Cl.$^7$ ............................................. B60K 1/00
(52) U.S. Cl. ................. 180/65.1; 180/65.3; 280/831; 280/834
(58) Field of Search .......................... 180/232, 274, 180/60, 291, 65.1, 65.2, 65.3; 280/831, 832, 834

(56) References Cited

U.S. PATENT DOCUMENTS

| 4,810,597 | A | * | 3/1989 | Kumagai et al. ............. 429/22 |
| 5,193,635 | A | * | 3/1993 | Mizuno et al. ............. 180/65.3 |
| 5,195,780 | A | * | 3/1993 | Inoue et al. ................. 280/634 |
| 5,354,115 | A | * | 10/1994 | Esaki ..................... 296/203.03 |
| 5,364,128 | A | * | 11/1994 | Ide ............................. 280/784 |
| 5,641,031 | A | * | 6/1997 | Riemer et al. ............. 180/65.3 |
| 5,662,184 | A | * | 9/1997 | Riemer et al. ............. 180/65.1 |
| 5,900,329 | A | * | 5/1999 | Reiter et al. ................. 429/17 |
| 6,203,099 | B1 | * | 3/2001 | Iwatsuki ..................... 296/204 |
| 6,378,637 | B1 | * | 4/2002 | Ono et al. ................. 180/65.3 |
| 6,679,345 | B2 | * | 1/2004 | Hirayama et al. ......... 180/65.3 |
| 6,679,546 | B2 | * | 1/2004 | Mishima et al. ....... 296/203.01 |

FOREIGN PATENT DOCUMENTS

JP 2000-149974 5/2000

* cited by examiner

Primary Examiner—Christopher P. Ellis
Assistant Examiner—Christopher Bottorff
(74) Attorney, Agent, or Firm—Lahive & Cockfield, LLP; Anthony A. Laurentano, Esq

(57) ABSTRACT

A body structure of a fuel cell vehicle which is driven using power generated by a fuel cell. The body structure comprises a frame unit which supports a fuel tank for storing fuel for the fuel cell; a fuel cell box which accommodates the fuel cell, the fuel cell box being disposed in proximity of the frame unit at a floor of the vehicle, a fuel feed pipe which connects the fuel tank and the fuel cell, and a pillar which is disposed at a position, viewed from the side of the vehicle, covering at least a part of the fuel cell box and at least a part of the frame unit.

2 Claims, 4 Drawing Sheets

FIG. 1

BODY STRUCTURE OF FUEL CELL VEHICLE

BACKGROUND OF THE INVENTION

1. Field of the Invention

The present invention relates to a body structure of a fuel cell vehicle. More specifically, the present invention relates to a body structure of a fuel cell vehicle, which is capable of protecting a fuel feed pipe that connects a fuel cell to a fuel tank which stores fuel for the fuel cell.

2. Description of Related Art

A fuel cell vehicle in which hydrogen, as a fuel gas, and oxygen, as an oxidizing agent, are supplied to generate power, and which uses the power to drive a motor, is known as a type of automobile.

In such a fuel cell vehicle, hydrogen which acts as a fuel gas is filled in a fuel tank and is supplied to a fuel cell together with oxygen which is extracted from the air. Accordingly, it is necessary to connect the fuel tank for storing the hydrogen gas to the fuel cell by using a fuel feed pipe.

Although sufficient safety against collisions is provided for the above-mentioned fuel cell and the fuel tank, it is also necessary to provide the same degree of safety for the fuel feed pipe which connects the fuel cell and the fuel tank. However, in order to ensure such safety for the fuel feed pipe, an increase in the weight of a vehicle is inevitable since it becomes necessary to provide a protector for the fuel feed pipe or increase the strength and rigidity of a panel surrounding the protector.

Also, as disclosed in Japanese Unexamined Patent Application, First Publication No. 2000-149974, a structure has been proposed in which a fuel cell is disposed at a roof portion in order to increase safety for collisions from any direction. However, there is a disadvantage in this structure in that the weight balance of the vehicle tends to be disturbed since it becomes necessary to increase the rigidity of the roof.

SUMMARY OF THE INVENTION

Accordingly, an object of the invention is to provide a body structure for a fuel cell vehicle which is capable of securely protecting a fuel feed pipe while preventing an increase in the body weight of a vehicle.

In order to achieve the above object, the present invention provides a body structure of a fuel cell vehicle which is driven using power generated by a fuel cell (for instance, a fuel cell 38 in an embodiment described later), comprising: a frame unit (for instance, a sub-frame 22 in an embodiment described later), which supports a fuel tank (for instance, hydrogen tanks 29 and 30 in an embodiment described later) for storing fuel for the fuel cell; a fuel cell box (for instance, a fuel cell box 39 in an embodiment described later) which accommodates the fuel cell, the fuel cell box being disposed in proximity of the frame unit at a floor (for instance, a front floor 1, or a rear floor 2 in an embodiment described later) of the vehicle; a fuel feed pipe (for instance, an assembly pipe 46, or feed pipes 47 and 49 in an embodiment described later) which connects the fuel tank and the fuel cell; and a pillar (for instance, a center pillar 71 or 81 in an embodiment described later) which is disposed at a position, viewed from the side of the vehicle, covering at least a part of the fuel cell box and at least a part of the frame unit.

According to the body structure described above, even if an obstacle is advanced between the fuel cell box and the frame unit from the side direction, it becomes possible to prevent the advance of the obstacle by the act of the pillar which is a framework for the side of the vehicle. Accordingly, a portion between the fuel cell box and the frame unit of the fuel feed pipe connecting the fuel tank and the fuel cell unit may be protected without using any special members.

The present invention also provides a body structure of a fuel cell vehicle which is driven using power generated by a fuel cell, comprising: a frame unit which supports a fuel tank for storing fuel for the fuel cell; a fuel cell box which accommodates the fuel cell, the fuel cell box being disposed in proximity of the frame unit at a floor of the vehicle; a fuel feed pipe which connects the fuel tank and the fuel cell; and a junction portion (for instance, a junction portion S in an embodiment described later) formed by a pillar and a side sill (for instance, a side sill 70 or 80 in an embodiment described later), which is disposed at a position, viewed from the side of the vehicle, covering at least a part of the fuel cell box and at least a part of the frame unit.

According to the body structure described above, even if an obstacle is advanced between the fuel cell box and the frame unit from the side direction, it becomes possible to prevent the advance of the obstacle by the act of the junction portion formed by the pillar and the side sill which is a framework for the side of the vehicle having relatively high rigidity. Accordingly, a portion between the fuel cell box and the frame unit of the fuel feed pipe connecting the fuel tank and the fuel cell unit may be securely protected without using any special members.

BRIEF DESCRIPTION OF THE DRAWINGS

Some of the features and advantages of the invention have been described, and others will become apparent from the detailed description which follows and from the accompanying drawings, in which:

FIG. 1 is a diagram showing a plan view of a body structure according to an embodiment of the present invention;

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, embodiments of the present invention will be described with reference to the accompanying drawings.

Figure 1:
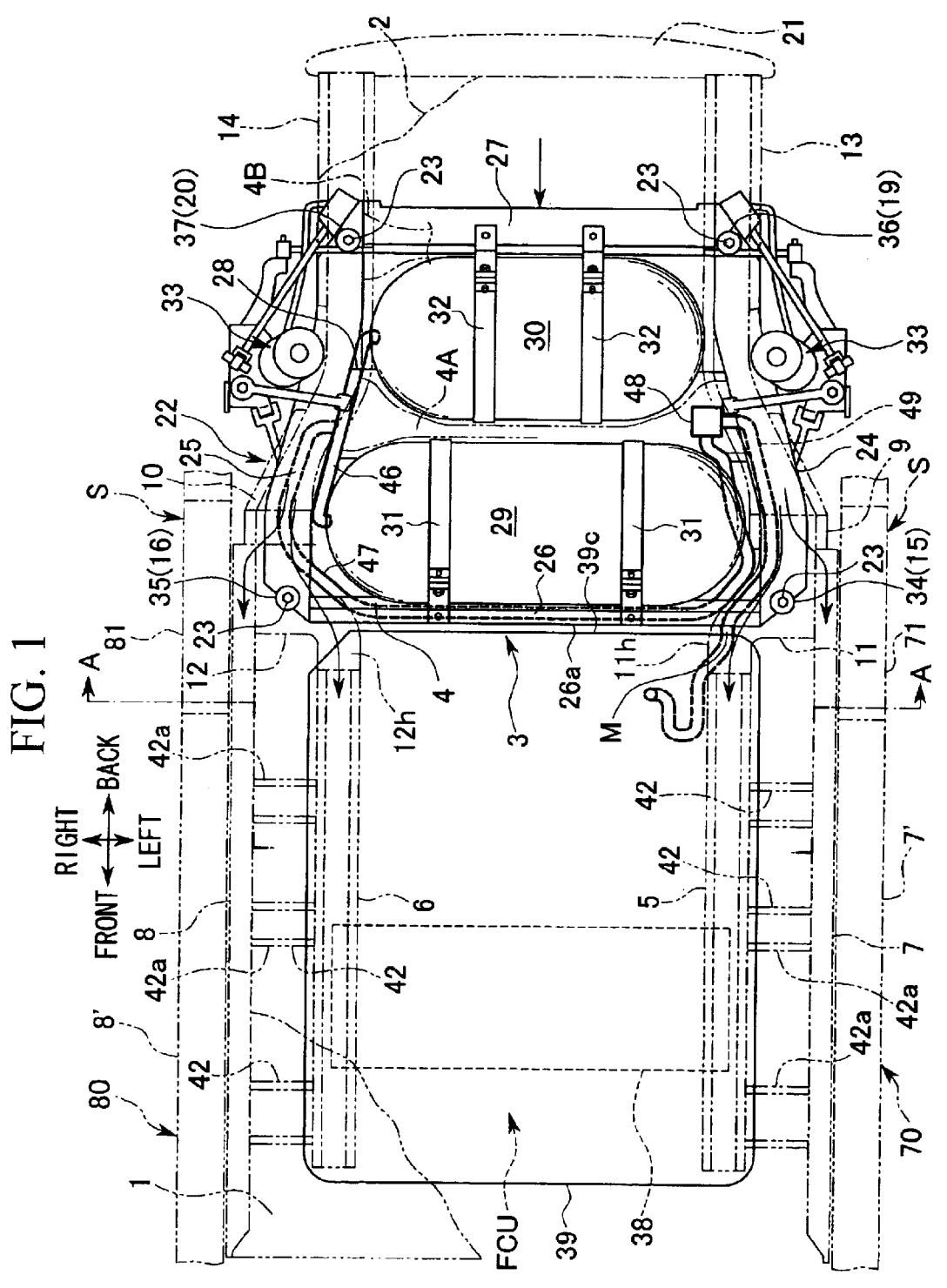
Figure 2:
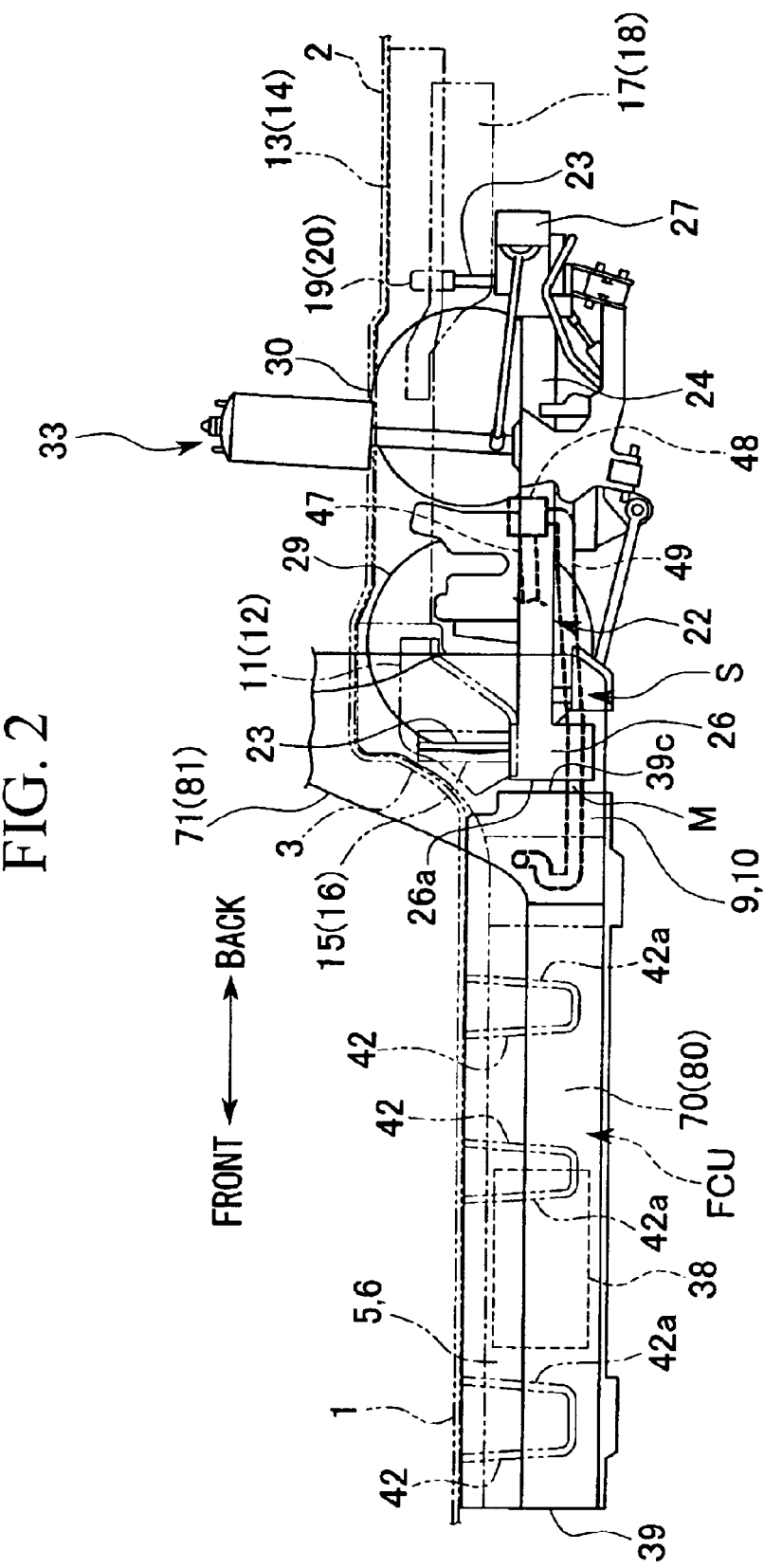
FIG. 2 is a diagram showing a side view of the body structure shown in FIG. 1 according to the embodiment of the present invention.
Figure 3:
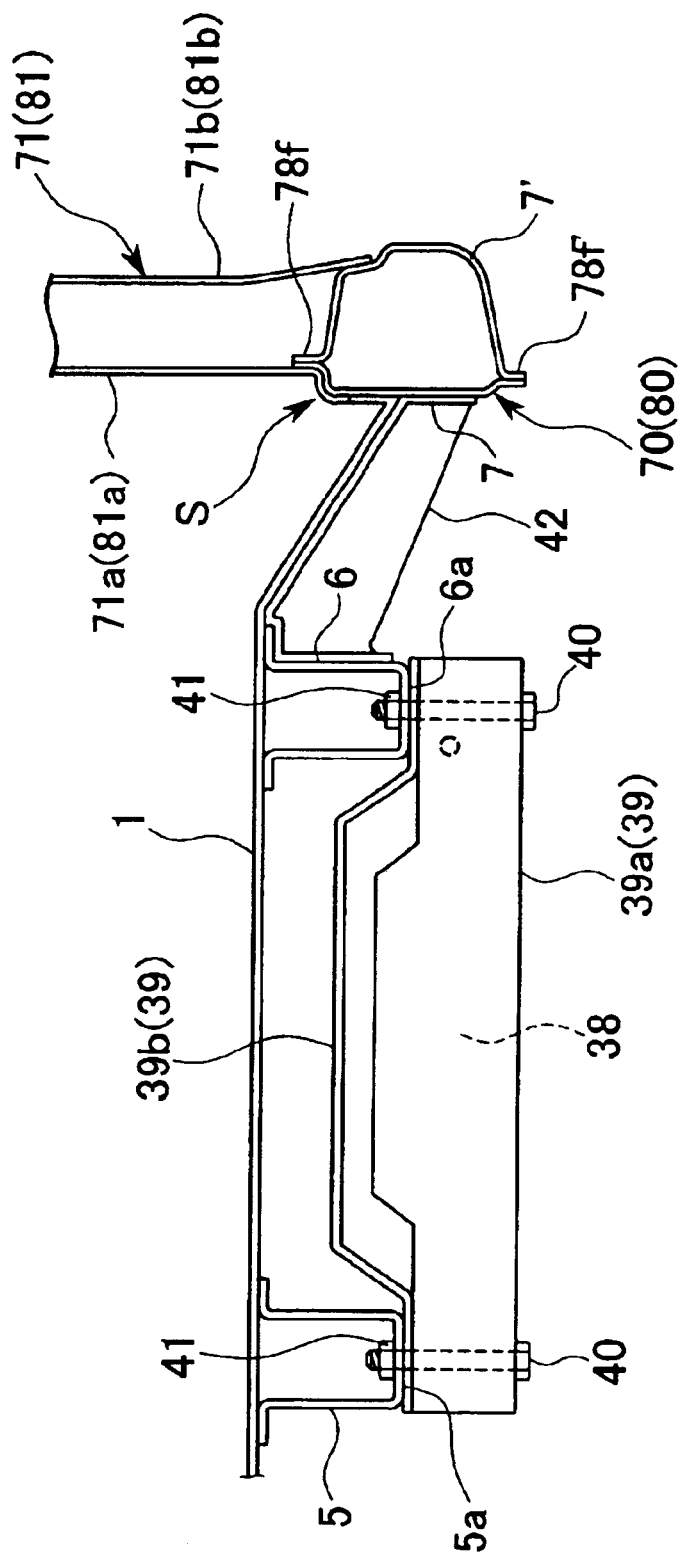
FIG. 3 is a diagram showing a cross-sectional view taken along the line A—A shown in FIG. 1.

As shown in FIGS. 1 through 3, a rear floor 2 having a step portion 3 which is formed so as to be uplifted at the back is joined to a rear end of a front floor 1. A cross member 4 (shown in FIG. 1 only) which forms a part of the framework of a vehicle is welded at the bottom of the step portion 3 of the rear floor 2 over the width direction of the vehicle. A pair of floor frames 5 and 6 that also form a part of the framework of the vehicle are connected to the bottom surface of the front floor 1 at left hand side and right hand side thereof, respectively, along the longitudinal direction of the vehicle.

A pair of inside sills 7 and 8 are connected to the right and left hand side edge portions, respectively, of the front floor 1, and inside sill extensions 9 and 10 are attached to the rear edge portion of the inside sills 7 and 8, respectively. Also, outside sills 7' and 8' are welded to the inside sills 7 and 8, respectively, to form each of side sills 70 and 80 that form the framework of the vehicle.

Figure 4:
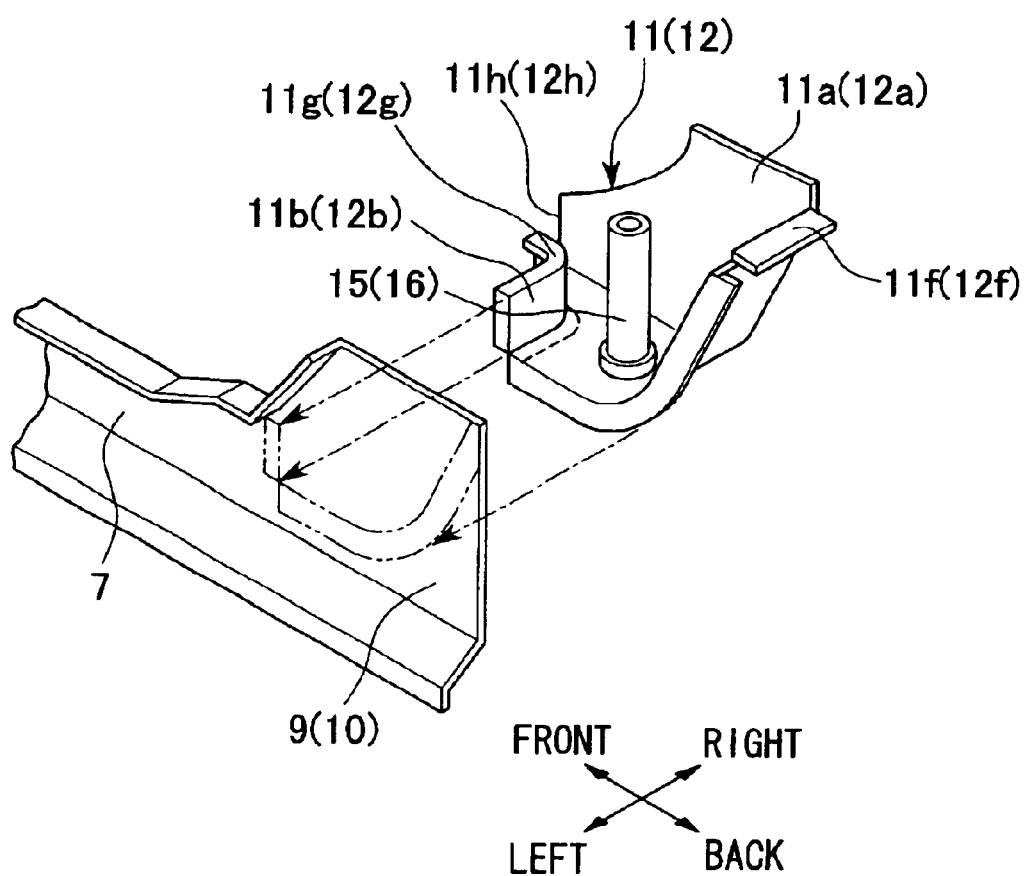
FIG. 4 is a diagram showing a perspective view of a front bracket which may be used in an embodiment according to the present invention.

As shown in FIG. 4, front brackets 11 and 12 are attached to an inside surface of the inside sills extensions 9 and 10, respectively. Note that in FIG. 4, only the inside sill extension 9 and the front bracket 11 located at the left hand side are shown, and the inside sill extension 10 and the bracket 12 are indicated by corresponding numerals shown in the brackets.

A flange portion 11f (12f) of rear upper end of the front bracket 11 (12) is attached to a bottom wall of a rear frame 13 (14), which will be explained later, and a flange portion 11g (12g) of front upper end of the front bracket 11 (12) is attached to a lower surface of the cross member 4. Also, a front wall 11b (12b) extends in a front direction together with an inner wall 11a (12a) to become a front frame connection portion 11h (12h) and attached to the floor frame 5 (6). Moreover, a collar nut 15 (16) is provided with the bottom wall of the front bracket 11 (12). Here, the rear frame 13 (14) is a member which is attached to the lower surface of the rear floor 2 and forms the framework of the vehicle.

Accordingly, a front end portion of the rear frame 13 (14) is connected to the side sill 70 (80) and the floor frame 5 (6) via the front bracket 11 (12).

As shown in FIG. 2, rear brackets 17 and 18 having a cross-section opened upwardly, are attached to the lower surface of the rear edge portion of the rear frames 13 and 14, respectively. Side walls of each of the rear brackets 17 and 18 are attached to the outside of both side walls of the rear frames 13 and 14, and collar nuts 19 and 20 are provided with the bottom wall of the front portion.

In this embodiment, as shown in FIG. 1, two cross members 4A and 4B are provided so as to connect the left and right hand side rear frames 13 and 14, and a bumper beam 21 is attached to a rear edge portion thereof, i.e., to a rear edge of the rear brackets 17 and 18.

Also, a sub-frame (frame unit) 22 is fixed to the front brackets 11 and 12 and the rear brackets 17 and 18 by screwing a bolt 23 into each of the collar nuts 15, 16, 19, and 20 from the bottom.

The sub-frame 22 includes a cross-beam 28 which is a member formed in a rectangular shape by right and left frame members 24 and 25 and front and back frame members 26 and 27 and extends in the width direction of the vehicle, and two hydrogen tanks 29 and 30 which function as fuel tanks are disposed at a respective position separated by the cross-beam 28 being tightened and fixed by bands 31 and 32, respectively. Also, a suspension unit 33 is attached to the sub-frame 22, and a tire, which is not shown in the figure, is attached to the suspension unit 33.

In addition, insertions 34 and 35 for the bolts 23 which are inserted into the above collar nuts 15 and 16 are provided at corners formed by the front edge of the left and right frame members 24 and 25 and both ends of the front frame member 26. Likewise, insertions 36 and 37 for the bolts 23 which are inserted into the above collar nuts 19 and 20 are provided at corners formed by the rear edge of the left and right frame members 24 and 25 and both ends of the rear frame member 27.

Accordingly, the sub-frame 22 is fixed to the rear frames 13 and 14 by inserting the bolt 23 into each of the insertions 34, 35, 36, and 37 of the sub-frame 22 formed in the manner as mentioned above, and screwing the bolt 23 into the collar nuts 15, 16, 19, and 20, which are provided with the front brackets 11 and 12 and the rear brackets 17 and 18 of the rear frames 13 and 14. In this embodiment, the front frame member 26 of the above-mentioned sub-frame 22 includes a flat surface 26a at the front thereof.

As shown in FIGS. 1 and 3, a fuel cell box 39 in which a fuel cell unit FCU including a fuel cell 38 and accessories is accommodated, is disposed below the front floor 1 so as to extend over the above-mentioned left and right floor frames 5 and 6.

The fuel cell 38 drives the fuel cell vehicle by reacting hydrogen gas supplied from the above-mentioned hydrogen tanks 29 and 30 with oxygen contained in air supplied from a compressor, which is not shown in the figure, to generate power, and by supplying the generated power to a driving motor.

The fuel cell box 39 includes a case main body 39a which covers the fuel cell unit FCU, and a cover 39a provided so as to cover the case main body 39a. The case main body 39a has a convex shape viewed from the side thereof, and hence the cover 39b is made to have a shape which matches the convex shape of the case main body 39a. The case main body 39a and the cover 39b are fixed to the bottom walls 5a and 6a of the floor frames 5 and 6, respectively, by tightening bolts 40 using nuts 41 as shown in FIG. 3. Note that a flat surface 39c (shown in FIGS. 1 and 2) is formed at the rear surface of the fuel cell box 39, i.e., the rear surface of the case main body 39a. The flat surface 39c at the back of the fuel cell box 39 is disposed in proximity to the flat surface 26a of the front of the sub-frame 22 (the front frame member 26) so as to oppose the other.

Here, as shown in FIGS. 1 and 2, the hydrogen tanks 29 and 30 are connected by high pressure assembly pipes 46, and a feed pipe 47 which is connected to the assembly pipes 46 and extends along the inside of the frame member 25 of the sub-frame 22 to reach the front portion of the hydrogen tank 29, is connected to a regulator 48 disposed between the hydrogen tanks 29 and 30. A feed pipe 49 which extends in a front direction from the regulator 48 and is arranged so as to extend and cross over the sub-frame 22 and the fuel cell box 39 within the width thereof, is inserted into the fuel cell unit FCU disposed in the fuel cell box 39 through the left rear portion at the back of the box 39.

Also, a portion M of the feed pipe 49 which extends from the regulator 48 towards the front direction is located at a position connecting the fuel cell box 39 to the sub-frame 22, and at the side of the portion M, each of the center pillars 71 and 81 is disposed at a position viewed from the side of the vehicle, extending from the back of the fuel cell box 39 over the front of the sub-frame 22.

More specifically, as shown in FIG. 3 which shows the left side of the body structure of the vehicle (note that the right hand side thereof is indicated only by numerical numbers in parentheses), the inside sill 7 (8) and the outside sill 7' (8') are welded to the flange portion 78f and 78f' at the upper and the lower ends thereof to form the side sill 70 (80) as a structure having a closed cross-section. The inside pillar 71a (81a) is welded to the upper flange portion 78f and the outside pillar 71b (81b) is welded to the outside surface of the outside sill 7' (8'), and the inside pillar 71a (81a) and the outside pillar 71b (81b) form the center pillar 71 (81) as the framework of the vehicle.

Also, as mentioned above, the portion M of the feed pipe 49 which extends from the regulator 48 towards the front direction is located at the position between the fuel cell box 39 and the sub-frame 22, and at the side of the portion M, a junction portion S of the side sill 70 (80) and the center pillar 71 (81) having relatively high rigidity as the framework for the side of the vehicle is disposed, viewed from the top, so as to cover the back of the fuel cell box 39 and the front of the sub-frame 22.

In this embodiment, three brackets 42 at one side, hence six at both sides, are welded to portions between the left and right floor frames 5 and 6 and the inside sills 7 and 8. The bracket 42 includes a flange portion 42a which is connected to the back of the floor frames 5 and 6, the inside sills 7 and 8, and the front floor 1.

According to the above embodiment, if a load is applied to the bumper beam 21 of the left and right rear frames 13 and 14, for example, when the vehicle is hit from the back, the load is divided and transmitted to each of the inside sills 7 and 8 and the floor frames 5 and 6 via the front brackets 11 and 12. Accordingly, no large load is applied to the sub-frame 22, and hence it becomes possible to securely protect the hydrogen tanks 29 and 30.

Also, the front end portion of the sub-frame 22 is connected to the front brackets 11 and 12 via the collar nuts 15 and 16, and the inside sills 7 and 8 and the floor frames 5 and 6 are connected to the outside and inside, respectively, of the interior of the vehicle. Accordingly, when a load generated by a collision is applied to the rear end portion of the sub-frame 22 (in a front direction indicated by an arrow in FIG. 1), for example, the load is divided into two parts by the front brackets 11 and 12, and is applied to the inside sills 7 and 8 and the floor frames 5 and 6.

Accordingly, as compared with the case where the collision load is concentratedly applied to the inside sills 7 and 8 or the floor frames 5 and 6, it becomes possible to increase the supporting strength and supporting rigidity by a degree corresponding to the divided load. Also, since the collision load is applied in a direction compressing the inside sills 7 and 8 and the floor frames 5 and 6 at that time, this is advantageous from the viewpoint of increasing its strength.

As a result, it becomes possible to securely protect the hydrogen tanks 29 and 30 of the sub-frame 22.

Moreover, if the position of the sub-frame 22 is changed towards the front direction when the collision load is applied to the front of the sub-frame 22, it is possible to reliably prevent the breakage of the fuel cell box 39 as compared with the case where the load is concentratedly applied to a part of the rear surface of the fuel cell box 39 since the flat surface 26a at the front of the frame member 26 of the sub-frame 22 is disposed so as to oppose the flat surface 39c at the back of the fuel cell box 39 so that the flat surface 26a of the sub-frame 22 makes the pressing force act uniformly over the entire flat surface 39c of the fuel cell box 39 and that the load is applied in a dispersed manner over the entire surface.

Furthermore, when the vehicle is hit from the side direction and an obstacle is about to enter between the fuel cell box 39 and the sub-frame 22, the center pillars 71 and 81 which extends in the up-and-down direction of the vehicle function as protectors and prevents the obstacle from moving into the vehicle. Accordingly, among the feed pipes connecting the fuel cell unit FCU and the hydrogen tanks 29 and 30, it becomes possible to prevent the portion M which is a part of the feed pipe 49 at the downstream of the regulator 48 and is located at the position connecting the fuel cell box 39 and the sub-frame 22, from being damaged by the obstacle.

In particular, since the junction portion S of the side sills 70 and 80 and the center pillars 71 and 81 having a relatively high rigidity as the framework at the sides of the vehicle, is disposed at the side of the portion M located between the fuel cell box 39 and the sub-frame 22, when the load is applied to the junction portion S, the load is divided and supported by the floor frames 5 and 6 via the bracket 42 and by a roof side frame, which is not shown in the figure, via the center pillars 71 and 81.

Accordingly, since the invasion of the obstacle is prevented and the junction portion S of the side sills 70 and 80 and the center pillars 71 and 81 is not deformed by the invading obstacle, it becomes possible to reliably prevent the breakage of the portion M which is located between the fuel cell box 39 and the sub-frame 22. Note that since tires which are attached to the suspension unit 22 are provided at the side of the sub-frame 22, it becomes possible to oppose a collision from this side direction and the safety against collision may also be secured for this portion.

As a result, it become unnecessary to provide a protector which covers the side of the feed pipe 49 for specially protecting the portion M between the fuel cell box 39 and the sub-frame 22 or to increase the strength and the rigidity of a panel therearound. Accordingly, it becomes possible to reliably protect the feed pipe 49, without increasing the body weight, by effectively using the available framework of the vehicle.

Note that since the assembly pipes 46, the feed pipe 47, and the rear portion of the feed pipe 49 are surrounded and protected by the frame members 24, 25, 26, and 27 of the sub-frame 22, and the front portion of the feed pipe 49 is placed so as to be within the width size of the fuel cell box 39, it becomes possible to securely protect the pipes from an obstacle coming from the sides of the vehicle.

Also, note that the present invention is not limited, by any means, to the embodiments explained above, and it is possible to apply the present invention as long as the portion M between the fuel cell 39 and the sub-frame 22 is present for a feed pipe connecting the hydrogen tanks 29 and 30 and the fuel cell unit FCU.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A body structure of a fuel cell vehicle which is driven using power generated by a fuel cell, comprising:
   a frame unit which supports a fuel tank for storing fuel for said fuel cell;
   a fuel cell box which accommodates said fuel cell, said fuel cell box being disposed in proximity of said frame unit at a floor of said fuel cell vehicle;
   a floor frame and a rear frame which extends in a back and forth direction relative to the fuel cell vehicle, said floor frame supporting said fuel cell box and said rear frame supporting said frame unit from an upper side;

a fuel feed pipe which is disposed between said frame unit and said fuel cell box, wherein said fuel feed pipe connects said fuel tank and said fuel cell; and a pillar which is disposed at a position, viewed from a side of said fuel cell vehicle, covering at least a part of said fuel cell box, at least a part of said frame unit, and a portion of said fuel feed pipe which is exposed between said fuel cell box and said frame unit.

2. A body structure of a fuel cell vehicle which is driven using power generated by a fuel cell, comprising:

a frame unit which supports a fuel tank for storing fuel for said fuel cell;

a fuel cell box which accommodates said fuel cell, said fuel cell box being disposed in proximity of said frame unit at a floor of said fuel cell vehicle;

a floor frame and a rear frame which extends in a back and forth direction relative to said fuel cell vehicle, said floor frame supporting said fuel cell box and said rear frame supporting said frame from an upper side;

a fuel feed pipe which is disposed between said frame unit and said fuel cell box, wherein said fuel feed pipe connects said fuel tank and said fuel cell; and a junction portion formed by a pillar and a side sill, which is disposed at a position, viewed from a side of said fuel cell vehicle, covering at least a part of said fuel cell box, at least a part of said frame unit, and a portion of said fuel feed pipe which is exposed between said fuel cell box and said frame unit.

* * * * *